United States Patent [19]
Hirose et al.

[11] Patent Number: 6,165,573
[45] Date of Patent: Dec. 26, 2000

[54] MULTI-LAYER LAMINATES AND USES THEREOF

[75] Inventors: Toshiyuki Hirose; Shigetoshi Nishijima; Yohzoh Yamamoto; Hideshi Kawachi, all of Waki-cho, Japan

[73] Assignee: Mitsui Petrochemical Industries LTD, Tokyo, Japan

[21] Appl. No.: 08/765,358

[22] PCT Filed: Jul. 4, 1995

[86] PCT No.: PCT/JP95/01331

§ 371 Date: Dec. 31, 1996

§ 102(e) Date: Dec. 31, 1996

[87] PCT Pub. No.: WO96/01184

PCT Pub. Date: Jan. 18, 1996

[30] Foreign Application Priority Data

Jul. 5, 1994 [JP] Japan .................................. 6-153987

[51] Int. Cl.$^7$ .......................... B32B 27/08; B32B 27/06; B32B 27/30; B32B 27/32

[52] U.S. Cl. ...................... 428/36.6; 428/35.7; 428/36.7; 428/500; 428/515; 428/516; 428/518; 428/520; 428/522; 428/523; 526/280; 526/281; 526/283

[58] Field of Search .................................. 428/35.7, 36.6, 428/36.7, 500, 515, 516, 518, 520, 522, 523; 526/280, 281, 283, 282

[56] References Cited

U.S. PATENT DOCUMENTS 5,218,049  6/1993  Yamamoto et al. ...................... 525/97

FOREIGN PATENT DOCUMENTS

| | | |
|---|---|---|
| 0518542 | 12/1992 | European Pat. Off. . |
| 0524802 | 1/1993 | European Pat. Off. . |
| 0532337 | 3/1993 | European Pat. Off. . |
| 0570188 | 11/1993 | European Pat. Off. . |
| 0610814 | 8/1994 | European Pat. Off. . |
| 0649737 | 4/1995 | European Pat. Off. . |
| 59-1352 | 1/1984 | Japan . |
| 2-196832 | 8/1990 | Japan . |

OTHER PUBLICATIONS

Schimitz, Peter et al., "Films." Ullmann's Encyclopedia of Industrial Chemistry, 5th Ed., vol. A11, pp. 85–86, 93, 103, 105, Jan. 1988.
English Lang. Abstract of Jap. Laid–Open Pat. Publ. No. 60–168708 (Sep. 2, 1985).
English Lang. Abstract of Jap. Laid–Open Pat. Publ. No. 61–120816 (Jun. 7, 1986).
English Lang. Abstract of Jap. Laid–Open Pat. Publ. No. 61–115912 (Jun. 3, 1986).
English Lang. Abstract of Jap. Laid–Open Pat. Publ. No. 61–115916 (Jun. 3, 1986).
English Lang. Abstract of Jap. Laid–Open Pat. Publ. No. 61–271308 (Dec. 1, 1986).
English Lang. Abstract of Jap. Laid–Open Pat. Publ. No. 61–272216 (Dec. 2, 1986).
English Lang. Abstract of Jap. Laid–Open Pat. Publ. No. 62–252406 (Nov. 4, 1987).
English Lang. Abstract of Jap. Laid–Open Pat. Publ. No. 62–252407 (Nov. 4, 1987).
English Lang. Abstract of Jap. Laid–Open Pat. Publ. No. 64–106 (Jan. 5, 1989).
English Lang. Abstract of Jap. Laid–Open Pat. Publ. No. 01–156308 (Jun. 19, 1989).
English Lang. Abstract of Jap. Laid–Open Pat. Publ. No. 01–197511 (Aug. 9, 1989).
English Lang. Abstract of Jap. Laid–Open Pat. Publ. No. 05–293159 (Nov. 9, 1993).
English Lang. Abstract of Jap. Laid–Open Pat. Publ. No. 61–243834 (Oct. 30, 1986).
English Lang. Abstract of Jap. Laid–Open Pat. Publ. No. 02–196832 (Aug. 3, 1990).
English Lang. Abstract of Jap. Laid–Open Pat. Publ. No. 05–261875 (Oct. 12, 1993).

*Primary Examiner*—Vivian Chen

[57] ABSTRACT

The present invention provides a multi-layer laminate consisting essentially of:

(A) a layer formed from an ethylene/cycloolefin random copolymer which is a copolymer of ethylene and a cycloolefin represented by a specific formula (e.g., tetracyclododecene), or a layer formed from a cycloolefin resin which is a graft modified product of the ethylene/cycloolefin random copolymer, or a layer formed from a cycloolefin resin composition comprising the cycloolefin resin and a polyolefin, and (B) a barrier layer consisting essentially of ethylene/vinyl alcohol copolymer, polyvinylidene chloride, or polyacrylonitrile, with the barrier layer having an oxygen permeability, as measured at 23° C. and RH of 0%, of not more than 10 cc(STP).mm/m$^2$.24 hr.atm; said multi-layer laminate having a moisture permeability of not more than 0.2 g.mm/m$^2$.24 hr.atm and an oxygen permeability of not more than 5 cc(STP).mm/m$^2$.24 hr.atm. This multi-layer laminate has excellent gas-barrier properties and high rigidity. The present invention also provides a packaging material and a film using the multi-layer laminate.

19 Claims, No Drawings

MULTI-LAYER LAMINATES AND USES THEREOF

CROSS-REFERENCE TO RELATED APPLICATION

This application is the National Phase entry under 35 USC 371, of International PCT application PCT/JP95/01331, filed Jul. 4, 1995, and designating the United States.

TECHNICAL FIELD

The present invention relates to multi-layer laminates which comprise a cycloolefin resin layer and a polymer layer and have a low oxygen permeability. The invention also relates to uses of the multi-layer laminates.

BACKGROUND ART

Packaging materials for daily necessaries, general merchandise, foods, tablet drugs, etc. are required to have various properties such as transparency, moisture resistance, heat-sealing properties, vacuum or pressure formability and twist-wrapping properties. However, use of only one kind of a resin cannot meet these requirements. Therefore, multi-layer laminates each comprising a sheet or a film of a certain resin and a sheet or a film of other resin with different properties have been widely employed. Also in the field of packaging materials, recycling of raw materials or incineration of the packaging materials has been recently paid much attention. From this viewpoint, polyolefin resins tend to be preferably employed as the packaging materials.

Of the polyolefin resins, cycloolefin resins are particularly suitable for the packaging materials, because they have excellent transparency, moisture resistance, vacuum or pressure formability and dead fold properties and they can be recycled or incinerated without any problem. However, since the cycloolefin resins are amorphous, they rapidly soften at temperatures close to their glass transition temperatures to cause lowering of elastic modulus and strength. Therefore, the molding conditions in the processes of heat-sealing, inflation and vacuum or pressure forming are restricted.

Meanwhile, the packaging materials used for packaging foods are desired to have low oxygen permeability because the objects packaged by the packaging materials easily deteriorate when they are brought into contact with oxygen of air. The cycloolefin resins have excellent properties as the packaging materials, e.g., high moldability and transparency. However, in the uses where high oxygen barrier properties are required, for example, in the uses for food-packaging, they are desired to be further improved in these properties.

Containers using thermoplastic resins are described in, for example, Japanese Patent Publication No. 104732/1994 and Japanese Patent Laid-Open Publication No. 1352/1984. These publications disclose laminating of an ethylene/vinyl alcohol copolymer (EVOH) and other thermoplastic resin, and the thermoplastic resins laminated together with the EVOH are, for example, polyesters such as PET and polyamides such as nylon. Japanese Patent Laid-Open Publication No. 293159/1993 discloses a container made of a laminate of a resin and EVOH, and the resin used herein is a hydrogenation product of a ring opening polymer of a cycloolefin.

It is an object of the present invention to provide a multi-layer laminate which has excellent formability, transparency, interlaminar bond properties, moisture resistance, flexibility, tearability, heat-sealing properties and dead fold properties and which is well-balanced between oxygen permeability and transparency. It is another object of the invention to provide a film, a sheet and a packaging material each of which is formed from the multi-layer laminate.

DISCLOSURE OF THE INVENTION

The multi-layer laminate of the invention comprises:

(A) a layer formed from at least one cycloolefin resin selected from the group consisting of
   (a-1) an ethylene/cycloolefin random copolymer comprising a cycloolefin represented by the following formula [1] or [2] and ethylene and
   (a-2) a graft modified product of the ethylene/cycloolefin random copolymer (a-1), or
   a layer formed from a cycloolefin resin composition comprising at least one cycloolefin resin selected from the group consisting of the ethylene/cycloolefin random copolymer (a-1) and the graft modified product (a-2) and (b) a polyolefin, and (B) a polymer layer having an oxygen permeability, as measured at a temperature of 23° C. and RH of 0%, of not more than 10 cc(STP).mm/m$^2$.24 hr.atm, said multi-layer laminate having a moisture permeability of not more than 0.2 g.mm/m$^2$.24 hr.atm and an oxygen permeability of not more than 5 cc(STP).mm/m$^2$.24 hr.atm;

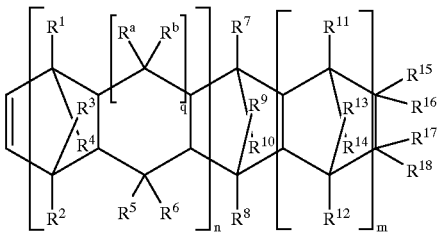

[1]

wherein n is 0 or 1; m is 0 or a positive integer; q is 0 or 1; $R^1$ to $R^{18}$, $R^a$ and $R^b$ are each independently an atom or a group selected from the group consisting of a hydrogen atom, a halogen atom and a hydrocarbon group; $R^{15}$ to $R^{18}$ may be bonded to each other to form a single ring or plural rings each of which may have a double bond; $R^{15}$ and $R^{16}$, or $R^{17}$ and $R^{18}$ may form an alkylidene group; and when q is 0, the bonding hands are bonded to each other to form a five-membered ring;

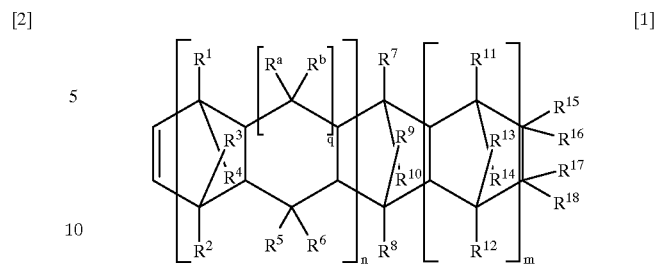

[2]

wherein m is 0 or a positive integer; h is 0 or a positive integer; j and k are each 0, 1 or 2; $R^7$ to $R^{15}$ and $R^{17}$ to $R^{18}$ are each independently an atom or a group selected from the group consisting of a hydrogen atom, a halogen atom and a hydrocarbon group; and $R^{19}$ to $R^{27}$ are each independently an atom or a group selected from the group consisting of a hydrogen atom, a halogen atom, a hydrocarbon group and an alkoxy group.

The multi-layer laminate of the invention has a layer containing a cycloolefin resin and a polymer layer having low oxygen permeability, so that the laminate shows excellent formability, transparency, interlaminar bond properties, moisture resistance, flexibility, tearability, heat-sealing properties and dead fold properties. Besides, the multi-layer laminate has an advantage in that the laminate is hardly permeated by gasses, particularly oxygen.

BEST MODE FOR CARRYING OUT THE INVENTION

The multi-layer laminate of the present invention and uses thereof will be described in detail hereinafter.

First of all, resins for forming the multi-layer laminate of the invention are described.

(A) Cycloolefin Resin and Cycloolefin Resin Composition

The cycloolefin resin and the cycloolefin resin composition comprising the cycloolefin resin and a polyolefin (A), which are raw materials for forming one of the layers of the multi-layer laminate of the invention, are described below.

The cycloolefin resin used in the invention includes:
  (a-1) a random copolymer of ethylene and a cycloolefin represented by the formula [1], and
  (a-2) a graft modified product of the random copolymer The cycloolefin resin used in the invention has a softening temperature (TMA), as measured by a thermal mechanical analyzer, of usually not lower than −30° C., preferably 0 to 180° C., more preferably 50 to 180° C. The softening temperature (TMA) is a temperature at which a quartz needle 1.0 mm in diameter, which is put on a sheet under a load of 49 g, penetrates 0.635 mm into the sheet, when the temperature of the sheet is raised at a rate of 5° C./min.

The cycloolefin resin has an intrinsic viscosity [η], as measured in decalin at 135° C., of usually 0.01 to 10 dl/g, preferably 0.05 to 2.0 dl/g, more preferably 0.4 to 1.2 dl/g.

The cycloolefin resin has a glass transition point (Tg) of usually not lower than −30° C., preferably −10 to 170° C., and has a crystallinity, as measured by X-ray diffractometry, of usually 0 to 20%, preferably 0 to 2%.

The cycloolefin used for forming the cycloolefin resin is described below.

As the cycloolefin, a compound represented by the following formula [1] or [2] is employed.

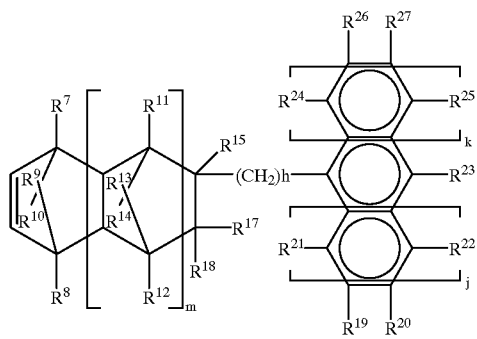

[1]

In the formula [1], n is 0 or 1, and m is 0 or a positive integer.

$R^1$ to $R^{18}$, $R^a$ and $R^b$ are each independently an atom or a group selected from the group consisting of a hydrogen atom, a halogen atom and a hydrocarbon group.

The halogen atom is fluorine, chlorine, bromine or iodine.

Examples of the hydrocarbon groups include alkyl groups of 1 to 20 carbon atoms, halogenated alkyl groups of 1 to 20 carbon atoms, cycloalkyl groups of 3 to 15 carbon atoms and aromatic hydrocarbon groups. More specifically, there can be mentioned:
  alkyl groups, such as methyl, ethyl, propyl, isopropyl, amyl, hexyl, octyl, decyl, dodecyl and octadecyl;
  halogenated alkyl groups, such as those wherein at least a part of the hydrogen atoms forming the above-exemplified alkyl groups are replaced with fluorine atoms, chlorine atoms, bromine atoms or iodine atoms;
  cycloalkyl groups, such as cyclohexyl; and
  aromatic hydrocarbon groups, such as phenyl and naphthyl.

In the formula [1], $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be bonded to each other to form (in cooperation) a single ring or plural rings, and the single ring or the plural rings may have a double bond.

Examples of such a single ring or such plural rings are described below.

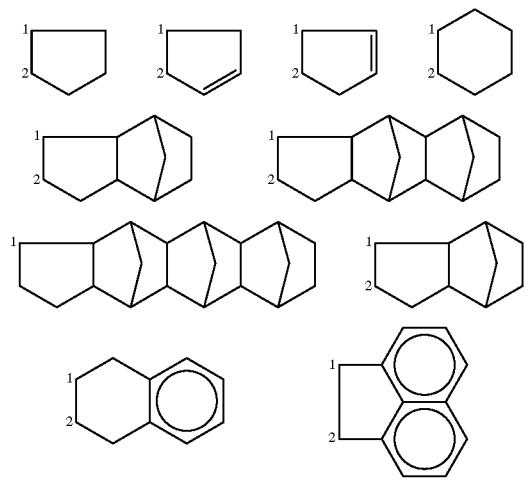

In the above examples, the carbon atoms numbered with 1 or 2 are each a carbon atom to which $R^{15}$ ($R^{16}$) or $R^{17}$ ($R^{18}$) in the formula [1] is bonded.

$R^{15}$ and $R^{16}$, or $R^{17}$ and $R^{18}$ may form an alkylidene group. The alkylidene group is usually an alkylidene group of 2 to 20 carbon atoms. Examples of such alkylidene groups include ethylidene, propylidene and isopropylidene.

Of the cycloolefins represented by the formula [1], a cycloolefin represented by the following formula [1-1] is preferable.

[1-1]

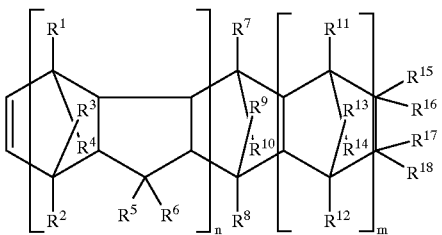

In the formula [1-1] n, m and $R^1$ to $R^{18}$ have the same meanings as in the formula [1].

Also employable as the cycloolefin is a compound represented by the following formula [2].

[2]

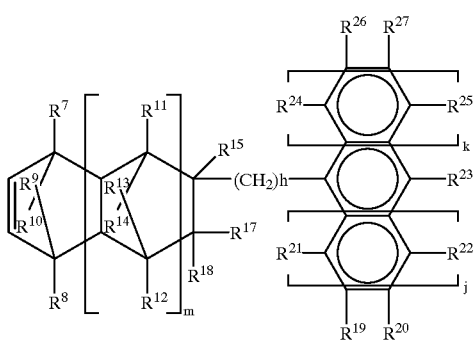

In the formula [2], m is 0 or a positive integer; h is 0 or a positive integer; j and k are each 0, 1 or 2; $R^7$ to $R^{15}$ and $R^{17}$ to $R^{18}$ have the same meanings as in the formula [1]; $R^{19}$ to $R^{27}$ are each independently an atom or a group selected from the group consisting of a hydrogen atom, a halogen atom, a hydrocarbon group and an alkoxy group.

The halogen atom is the same halogen atom as in the formula [1].

Examples of the hydrocarbon groups indicated by $R^{19}$ to $R^{27}$ in the formula [2] include alkyl groups of 1 to 20 carbon atoms, halogenated alkyl groups of 1 to 20 carbon atoms, cycloalkyl groups of 3 to 15 carbon atoms and aromatic hydrocarbon groups.

More specifically, there can be mentioned:
  alkyl groups, such as methyl, ethyl, propyl, isopropyl, amyl, hexyl, octyl, decyl, dodecyl and octadecyl;
  halogenated alkyl groups, such as those wherein at least a part of the hydrogen atoms forming the above-exemplified alkyl groups are replaced with fluorine atoms, chlorine atoms, bromine atoms or iodine atoms;
  cycloalkyl groups, such as cyclohexyl; and
  aromatic hydrocarbon groups, such as aryl groups and aralkyl groups, e.g., phenyl, tolyl, naphthyl, benzyl and phenylethyl.

Examples of the alkoxy groups include methoxy, ethoxy and propoxy.

A carbon atom to which $R^{17}$ and $R^{18}$ are bonded may be linked to a carbon atom to which $R^{21}$ is bonded or a carbon atom to which $R^{19}$ is bonded, directly or through an alkylene group of 1 to 3 carbon atoms. That is, when the above-mentioned two carbon atoms are linked through an alkylene group, the groups indicated by $R^{17}$ and $R^{21}$ or the groups indicated by $R^{18}$ and $R^{19}$ form in cooperation any alkylene group of a methylene group (—$CH_2$—), an ethylene group (—$CH_2CH_2$—) and a trimethylene group (—$CH_2CH_2CH_2$—).

In case of J=k=0, $R^{23}$ and $R^{20}$, or $R^{23}$ and $R^{27}$ may be bonded to each other to form a single aromatic ring or plural aromatic rings. Examples of the single or plural aromatic rings in case of j=k=0 include the following groups wherein $R^{23}$ and $R^{20}$ further form aromatic rings in cooperation.

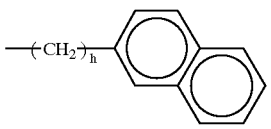

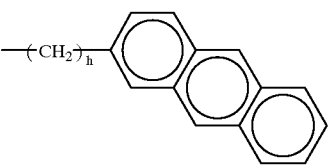

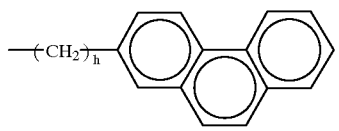

In the above formulas, h has the same meaning as that of h in the formula [2].

Listed below are examples of the cycloolefins represented by the formula [1] or [2].

Bicyclo[2.2.1]hepto-2-ene derivatives,
  Tetracyclo[4.4.0.1$^{2,5}$.1$^{7,10}$]-3-dodecene derivatives,
  Hexacyclo[6.6.1.1$^{3,6}$.1$^{10,13}$.0$^{2,7}$.0$^{9,14}$]-4-heptadecene derivatives,
  Octacyclo [8.8.0.1$^{2,9}$.1$^{4,7}$.1$^{11,18}$.1$^{13,16}$.0$^{3,8}$.0$^{12,17}$]-5-docosene derivatives,
  Pentacyclo [6.6.1.1$^{3,6}$.0$^{2,7}$.0$^{9,14}$]-4-hexadecene derivatives,
  Heptacyclo-5-eicosene derivatives,
  Heptacyclo-5-heneicosene derivatives,
  Tricyclo[4.3.0.1$^{2,5}$]-3-decene derivatives,
  Tricyclo[4.4.0.1$^{2,5}$]-3-undecene derivatives,
  Pentacyclo [6.5.1.1$^{3,6}$.0$^{2,7}$.0$^{9,13}$]-4-pentadecene derivatives,
  Pentacyclopentadecadiene derivatives,
  Pentacyclo[7.4.0.1$^{2,5}$.1$^{9,12}$.0$^{8,13}$]-3-pentadecene derivatives,
  Heptacyclo [8.7.0.1$^{3,6}$.1$^{10,17}$.1$^{12,15}$.0$^{2,7}$.0$^{11,16}$]-4-eicosene derivatives,
  Nonacyclo [10.9.1.1$^{4,7}$.1$^{13,20}$.1$^{15,18}$.0$^{3,8}$.0$^{2,10}$.0$^{12,21}$.0$^{14,19}$]-5-pentacosene derivatives,
  Pentacyclo[8.4.0.1$^{2,5}$.1$^{9,12}$.0$^{8,13}$]-3-hexadecene derivatives,
  Heptacyclo [8.8.0.1$^{4,7}$.1$^{11,18}$.1$^{13,16}$.0$^{3,8}$.0$^{12,17}$]-5-heneicosene derivatives,
  Nonacyclo [10.10.1.1$^{5,8}$.1$^{14,21}$.1$^{16,19}$.0$^{2,11}$.0$^{4,9}$.0$^{13,22}$.0$^{15,20}$]-5-hexacosene derivatives,
  1,4-Methano-1,4,4a,9a-tetrahydrofluorene derivatives,
  1,4-Methano-1,4,4a,5,10,10a-hexahydroanthracene derivatives, and
  Cyclopentadiene-acenaphthylene addition products.

Listed below are more specific examples of the cycloolefins represented by the formula [1] or [2].

The bicyclo[2.2.1]hept-2-ene derivatives such as:

| Structure | Name |
|---|---|
| | Bicyclo[2.2.1]hept-2-ene |
| —CH$_3$ | 6-Methylbicyclo[2.2.1]hept-2-ene |
| —CH$_3$, —CH$_3$ | 5,6-Dimethylbicyclo[2.2.1]-hept-3-ene |
| CH$_3$ | 1-Methylbicyclo[2.2.1]hept-2-ene |
| —C$_2$H$_5$ | 6-Ethylbicyclo[2.2.1]hept-2-ene |
| —nC$_4$H$_9$ | 6-n-Butylbicyclo[2.2.1]hept-2-ene |
| —iC$_4$H$_9$ | 6-Isobutylbicyclo[2.2.1]hept-2-ene |
| CH$_3$ | 7-Methylbicyclo[2.2.1]hept-2-ene; | the tetrocyclo[4.4.0.1$^{2,5}$.1$^{7,10}$]-3-dodecene derivatives such as:

| Structure | Name |
|---|---|
| | Tetracyclo[4.4.0.1$^{2,5}$.1$^{7,10}$]-3-dodecene, |
| CH$_3$ | 8-Methyltetracyclo[4.4.0.1$^{2,5}$.1$^{7,10}$]-3-dodecene |
| C$_2$H$_5$ | 8-Ethyltetracyclo[4.4.0.1$^{2,5}$.1$^{7,10}$]-3 dodecene |
| C$_3$H$_7$ | 8-Propyltetracyclo[4.4.0.1$^{2,5}$.1$^{7,10}$]-3-dodecene |
| C$_4$H$_9$ | Butyltetracyclo[4.4.0.1$^{2,5}$.1$^{7,10}$]-3-dodecene |
| CH$_2$CH(CH$_3$)$_2$ | 8-Isobutyltetracyclo-[4.4.0.1$^{2,5}$.1$^{7,10}$]-3-dodecene |
| C$_6$H$_{13}$ | 8-Hexyltetracyclo[4.4.0.1$^{2,5}$.1$^{7,10}$]-3-dodecene |
| cyclohexyl | 8-Cyclohexyltetracyclo-[4.4.0.1$^{2,5}$.1$^{7,10}$]-3-dodecene |
| C$_{18}$H$_{37}$ | 8-Stearyltetracyclo-[4.4.0.1$^{2,5}$.1$^{7,10}$]-3-dodecene |
| CH$_3$, CH$_3$ | 5,10-Dimethyltetracyclo-[4.4.0.1$^{2,5}$.1$^{7,10}$]-3-dodecene |
| CH$_3$, CH$_3$ | 2,10-Dimethyltetracyclo-[4.4.0.1$^{2,5}$.1$^{7,10}$]-3-dodecene |
| CH$_3$, CH$_3$ | 8,9-Dimethyltetracyclo-[4.4.0.1$^{2,5}$.1$^{7,10}$]-3-dodecene |
| CH$_3$, C$_2$H$_5$ | 8-Ethyl-9-methyltetracyclo-[4.4.0.1$^{2,5}$.1$^{7,10}$]-3-dodecene |

-continued

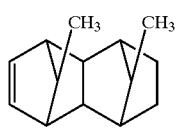 11,12-Dimethyltetracyclo-[4.4.0.1$^{2,5}$.1$^{7,10}$]-3-dodecene

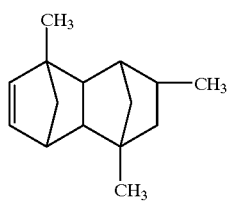 2,7,9-Trimethyltetracyclo-[4.4.0.1$^{2,5}$.1$^{7,10}$]-3-dodecene

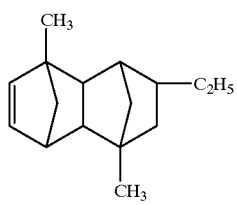 9-Ethyl-2,7-dimethyltetracyclo-[4.4.0.1$^{2,5}$.1$^{7,10}$]-3-dodecene

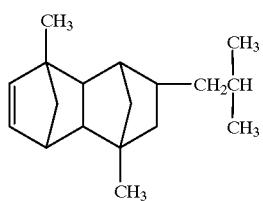 9-Isobutyl-2,7-dimethyltetracyclo-[4.4.0.1$^{2,5}$.1$^{7,10}$]-3-dodecene

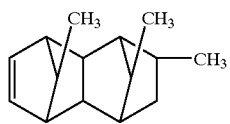 9,11,12-Trimethyltetracyclo-[4.4.0.1$^{2,5}$.1$^{7,10}$]-3-dodecene

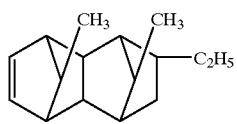 9-Ethyl-11,12-dimethyltetracyclo-[4.4.0.1$^{2,5}$.1$^{7,10}$]-3-dodecene

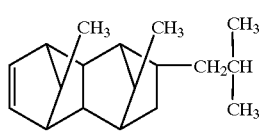 9-Isobutyl-11,12-dimethyltetracyclo-[4.4.0.1$^{2,5}$.1$^{7,10}$]-3-dodecene

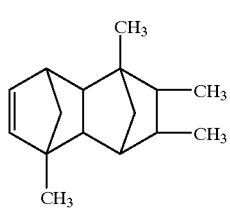 5,8,9,10-Tetramethyltetracyclo-[4.4.0.1$^{2,5}$.1$^{7,10}$]-3-dodecene

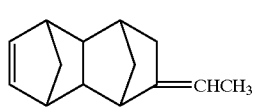 8-Ethylidenetetracyclo-[4.4.0.1$^{2,5}$.1$^{7,10}$]-3-dodecene

-continued

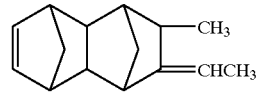 8-Ethylidene-9-methyltetracyclo-[4.4.0.1$^{2,5}$.1$^{7,10}$]-3-dodecene

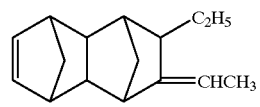 8-Ethylidene-9-ethyltetracyclo-[4.4.0.1$^{2,5}$.1$^{7,10}$]-3-dodecene

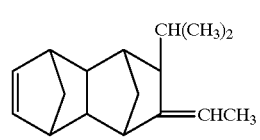 8-Ethylidene-9-isopropyltetracyclo-[4.4.0.1$^{2,5}$.1$^{7,10}$]-3-dodecene

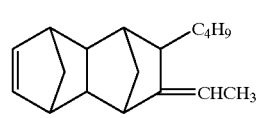 8-Ethylidene-9-butyltetracyclo-[4.4.0.1$^{2,5}$.1$^{7,10}$]-3-dodecene

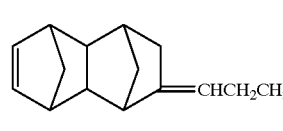 8-n-Propylidenetetracyclo-[4.4.0.1$^{2,5}$.1$^{7,10}$]-3-dodecene

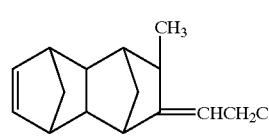 8-n-Propylidene-9-methyltetracyclo-[4.4.0.1$^{2,5}$.1$^{7,10}$]-3-dodecene

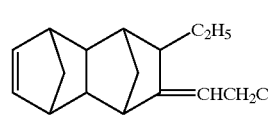 8-n-Propylidene-9-ethyltetracyclo-[4.4.0.1$^{2,5}$.1$^{7,10}$]-3-dodecene

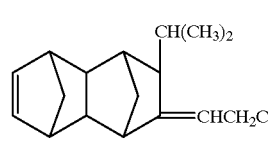 8-n-Propylidene-9-isopropyltetracyclo-[4.4.0.1$^{2,5}$.1$^{7,10}$]-3-dodecene

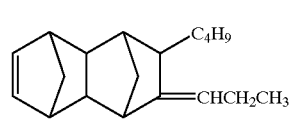 8-n-Propylidene-9-butyltetracyclo-[4.4.0.1$^{2,5}$.1$^{7,10}$]-3-dodecene

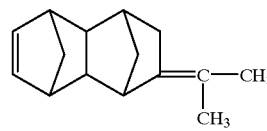 8-Isopropylidenetetracyclo-[4.4.0.1$^{2,5}$.1$^{7,10}$]-3-dodecene

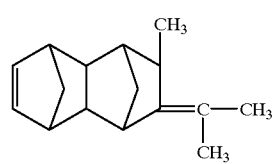 8-Isopropylidene-9-methyltetracyclo-[4.4.0.1$^{2,5}$.1$^{7,10}$]-3-dodecene

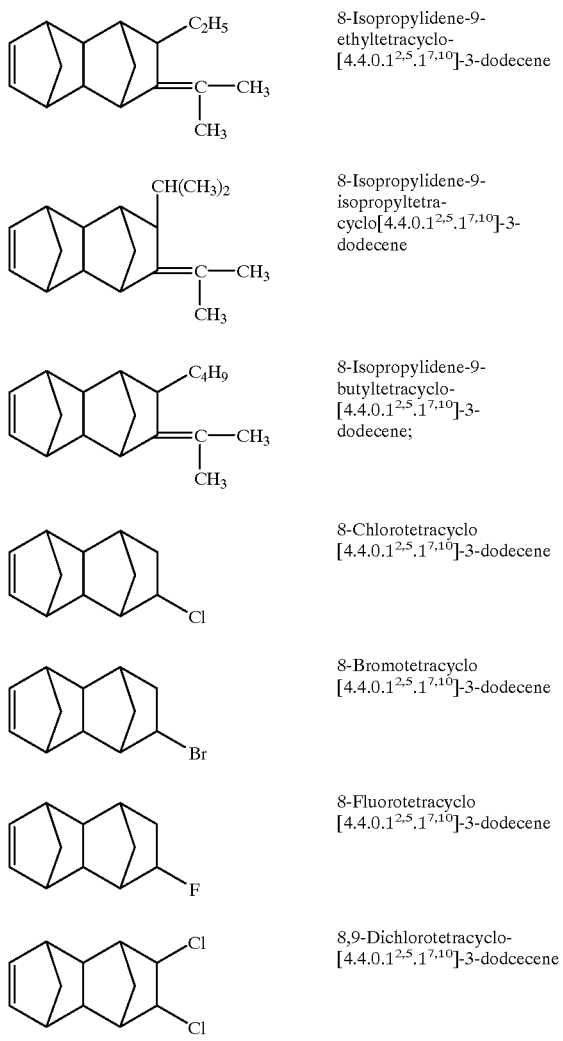

| | |
|---|---|
| | 8-Isopropylidene-9-ethyltetracyclo-[4.4.0.1$^{2,5}$.1$^{7,10}$]-3-dodecene |
| | 8-Isopropylidene-9-isopropyltetra-cyclo[4.4.0.1$^{2,5}$.1$^{7,10}$]-3-dodecene |
| | 8-Isopropylidene-9-butyltetracyclo-[4.4.0.1$^{2,5}$.1$^{7,10}$]-3-dodecene; |
| | 8-Chlorotetracyclo[4.4.0.1$^{2,5}$.1$^{7,10}$]-3-dodecene |
| | 8-Bromotetracyclo[4.4.0.1$^{2,5}$.1$^{7,10}$]-3-dodecene |
| | 8-Fluorotetracyclo[4.4.0.1$^{2,5}$.1$^{7,10}$]-3-dodecene |
| | 8,9-Dichlorotetracyclo-[4.4.0.1$^{2,5}$.1$^{7,10}$]-3-dodcecene | the hexacyclo[6.6.1.1$^{3,6}$.1$^{10,13}$.0$^{2,7}$.0$^{9,14}$]-4-heptadecene derivatives such as:

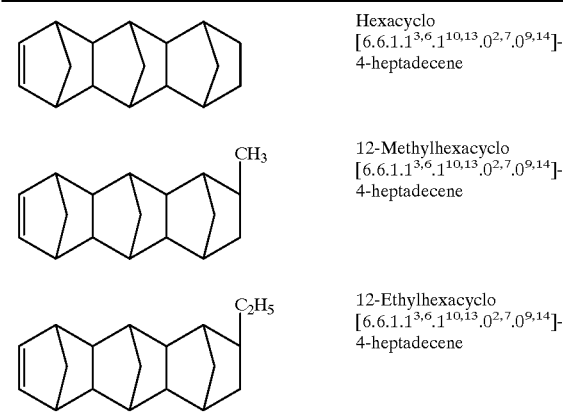

| | |
|---|---|
| | Hexacyclo[6.6.1.1$^{3,6}$.1$^{10,13}$.0$^{2,7}$.0$^{9,14}$]-4-heptadecene |
| | 12-Methylhexacyclo[6.6.1.1$^{3,6}$.1$^{10,13}$.0$^{2,7}$.0$^{9,14}$]-4-heptadecene |
| | 12-Ethylhexacyclo[6.6.1.1$^{3,6}$.1$^{10,13}$.0$^{2,7}$.0$^{9,14}$]-4-heptadecene |

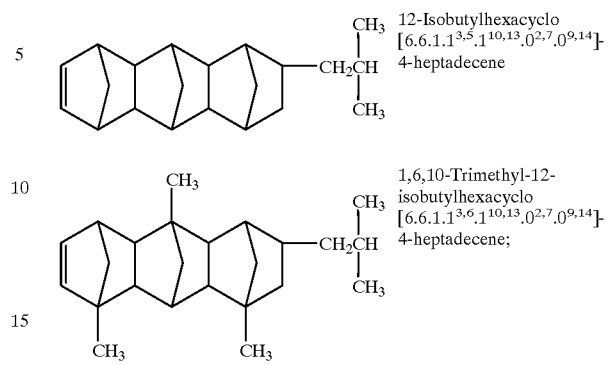

| | |
|---|---|
| | 12-Isobutylhexacyclo[6.6.1.1$^{3,5}$.1$^{10,13}$.0$^{2,7}$.0$^{9,14}$]-4-heptadecene |
| | 1,6,10-Trimethyl-12-isobutylhexacyclo[6.6.1.1$^{3,6}$.1$^{10,13}$.0$^{2,7}$.0$^{9,14}$]-4-heptadecene; | the octacyclo[8.8.0.1$^{2,9}$.1$^{4,7}$.1$^{11,18}$.1$^{13,16}$.0$^{3,8}$.0$^{12,17}$]-5-docosene derivatives such as:

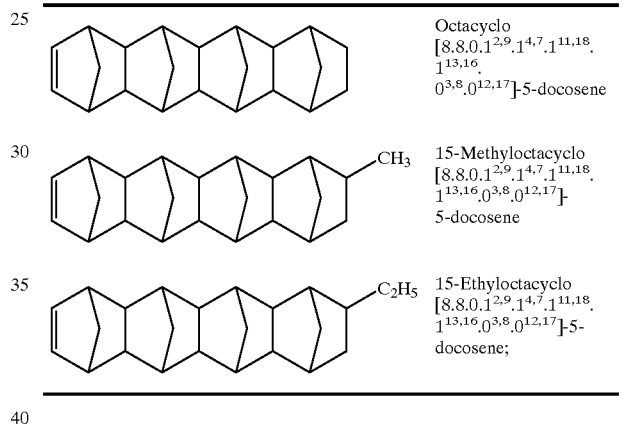

| | |
|---|---|
| | Octacyclo[8.8.0.1$^{2,9}$.1$^{4,7}$.1$^{11,18}$.1$^{13,16}$.0$^{3,8}$.0$^{12,17}$]-5-docosene |
| | 15-Methyloctacyclo[8.8.0.1$^{2,9}$.1$^{4,7}$.1$^{11,18}$.1$^{13,16}$.0$^{3,8}$.0$^{12,17}$]-5-docosene |
| | 15-Ethyloctacyclo[8.8.0.1$^{2,9}$.1$^{4,7}$.1$^{11,18}$.1$^{13,16}$.0$^{3,8}$.0$^{12,17}$]-5-docosene; | the pentacyclo[6.6.1.1$^{3,6}$.0$^{2,7}$.0$^{9,14}$]-4-hexadecene derivatives such as:

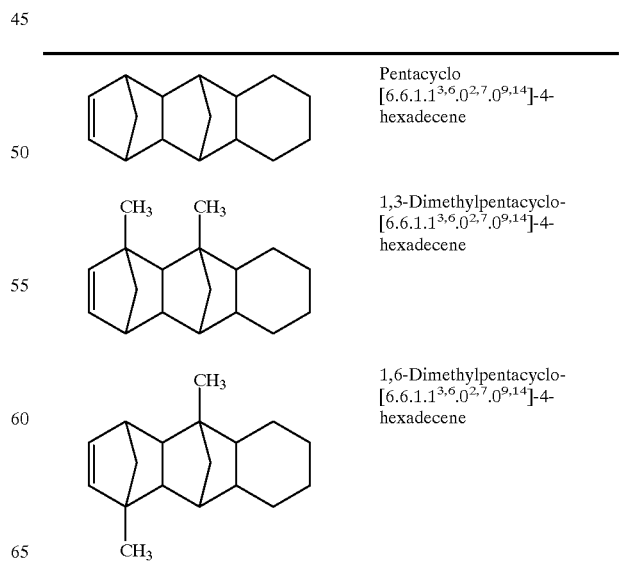

| | |
|---|---|
| | Pentacyclo[6.6.1.1$^{3,6}$.0$^{2,7}$.0$^{9,14}$]-4-hexadecene |
| | 1,3-Dimethylpentacyclo-[6.6.1.1$^{3,6}$.0$^{2,7}$.0$^{9,14}$]-4-hexadecene |
| | 1,6-Dimethylpentacyclo-[6.6.1.1$^{3,6}$.0$^{2,7}$.0$^{9,14}$]-4-hexadecene |

-continued

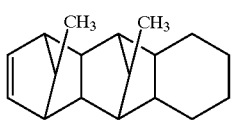 15,16-Dimethylpentacyclo-[6.6.1.1$^{3,6}$.0$^{2,7}$.0$^{9,14}$]-4-hexadecene;

the hepacyclo-5-eicosene derivatives or heptacyclo-5-heneicosene derivatives such as:

 Heptacyclo[8.7.0.1$^{2,9}$.1$^{4,7}$.1$^{11,17}$.0$^{3,8}$.0$^{12,16}$]-5-eicosene;

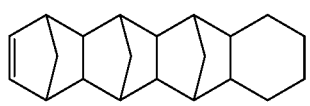 Heptayclo[8.8.0.1$^{2,9}$.1$^{4,7}$.1$^{11,18}$.0$^{3,8}$.0$^{12,17}$]-5-heneicosene the tricyclo[4.3.0.1$^{2,5}$]-3-decene derivatives such as:

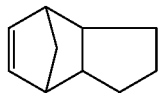 Tricyclo[4.3.0.1$^{2,5}$]-3-decene,

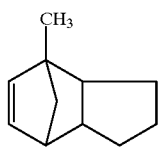 2-Methyltricyclo[4.3.0.1$^{2,5}$]-3-decene

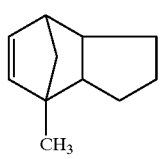 5-Methyltricyclo[4.3.0.1$^{2,5}$]-3-decene;

the tricyclo[4.4.0.1$^{2,5}$]-3-undecene derivatives such as:

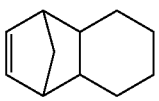 Tricyclo[4.4.0.1$^{2,5}$]-3-undecene

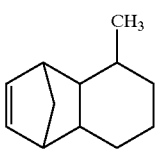 10-Methyltricyclo[4.4.0.1$^{2,5}$]-3-undecene;

the pentacyclo[6.5.1.1$^{3,6}$.0$^{2,7}$.0$^{9,13}$]-4-pentadecene derivatives such as:

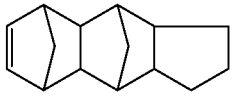 Pentacyclo[6.5.1.1$^{3,6}$.0$^{2,7}$.0$^{9,13}$]-4-pentadecene

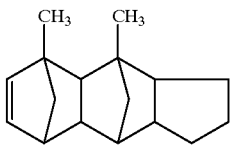 1,3-Dimethylpentacyclo-[6.5.1.1$^{3,6}$.0$^{2,7}$.0$^{9,13}$]-4-pentadecene

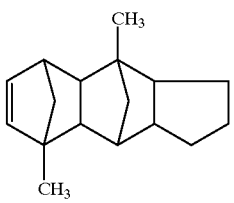 1,6-Dimethylpentacyclo-[6.5.1.1$^{3,6}$.0$^{2,7}$.0$^{9,13}$]-4-pentadecene

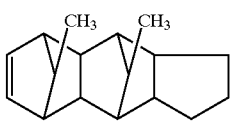 14,15-Dimethylpentacyclo[6.5.1.1$^{3,6}$.0$^{2,7}$.0$^{9,13}$]-4-pentadecene;

the diene derivatives such as:

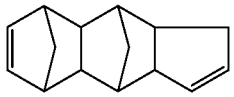 Pentacyclo[6.5.1.1$^{3,6}$.0$^{2,7}$.0$^{9,13}$]-4,10-pentadecadiene;

the pentacyclo[7.4.0.1$^{2,5}$.1$^{9,12}$.0$^{8,13}$]-3-pentadecene derivatives such as:

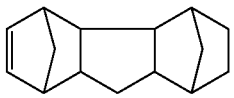 Pentacyclo[7.4.0.1$^{2,5}$.1$^{9,12}$.0$^{8,13}$]-3-pentadecene

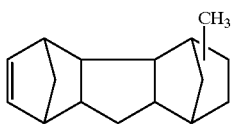 Methyl-substituted pentacyclo[7.4.0.1$^{2,5}$.1$^{9,12}$.0$^{8,13}$]-3-pentadecene;

the heptacyclo[8.7.0.1$^{3,6}$.1$^{10,17}$.1$^{12,15}$.0$^{2,7}$.0$^{11,16}$]-4-eicosene derivatives such as:

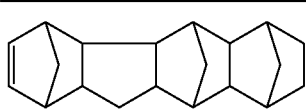 Heptacyclo[8.7.0.1$^{3,6}$.1$^{10,17}$.1$^{12,15}$.0$^{2,7}$.0$^{11,16}$]-4-eicosene -continued

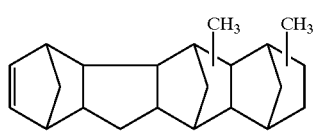
Dimethyl-substituted heptacyclo-[8.7.0.1$^{3,6}$.1$^{10,17}$.1$^{12,15}$.0$^{2,7}$.0$^{11,16}$]-4-eicosene;

the nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives such as:

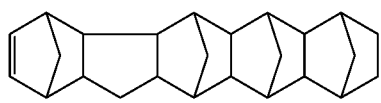
Nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene

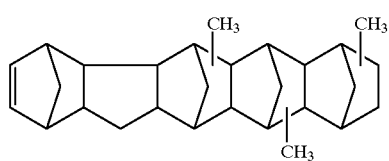
Trimethyl-substituted-nonacyclo-[10.9.1.1$^{4,7}$.1$^{13,20}$.1$^{15,18}$.0$^{3,8}$.0$^{2,10}$.0$^{12,21}$.0$^{14,19}$]-5-pentacosene the pentacyclo[8.4.0.1$^{2,5}$.1$^{9,12}$.0$^{8,13}$]-3-hexadecene derivatives such as:

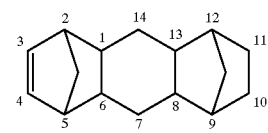
Pentacyclo[8.4.0.1$^{2,5}$.1$^{9,12}$.0$^{8,13}$]-3-hexadecene

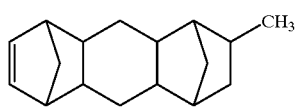
11-Methylpentacyclo[8.4.0.1$^{2,5}$.1$^{9,12}$.0$^{8,13}$]-3-hexadecene

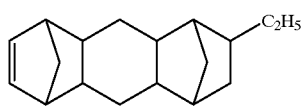
11-Ethylpentacyclo[8.4.0.1$^{2,5}$.1$^{9,12}$.0$^{8,13}$]-3-hexadecene

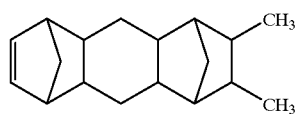
10,11-Dimethylpentacyclo[8.4.0.1$^{2,5}$.1$^{9,12}$.0$^{8,13}$]-3-hexadecene;

the hepacyclo[8.8.0.1$^{4,7}$.1$^{11,18}$.1$^{13,16}$.0$^{3,8}$.0$^{12,17}$]-5-heneicosene derivatives such as:

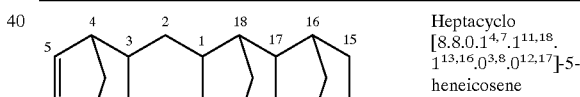
Heptacyclo[8.8.0.1$^{4,7}$.1$^{11,18}$.1$^{13,16}$.0$^{3,8}$.0$^{12,17}$]-5-heneicosene

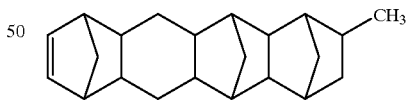
15-Methylheptacyclo[8.8.0.1$^{4,7}$.1$^{11,18}$.1$^{13,16}$.0$^{3,8}$.0$^{12,17}$]-5-heneicosene

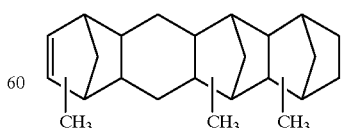
Trimethyl-heptacyclo[8.8.0.1$^{4,7}$.1$^{11,18}$.1$^{13,16}$.0$^{3,8}$.0$^{12,17}$]-5-heneicosene;

the nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as:

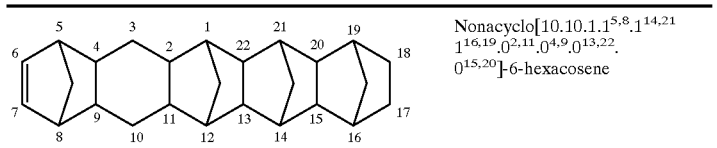
Nonacyclo[10.10.1.1^{5,8}.1^{14,21}.1^{16,19}.0^{2,11}.0^{4,9}.0^{13,22}.0^{15,20}]-6-hexacosene
and furthermore,
5-Phenyl-bicyclo[2.2.1]hept-2-ene
5-Methyl-5-phenyl-bicyclo[2.2.1]-hept-2-ene
5-Benzyl-bicylco[2.2.1]hept-2-ene
5-Tolyl-bicyclo[2.2.1]hept-2-ene
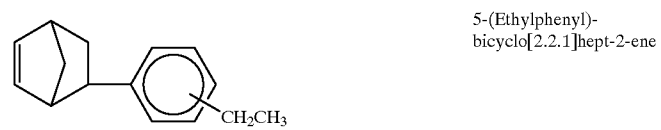
5-(Ethylphenyl)-bicyclo[2.2.1]hept-2-ene
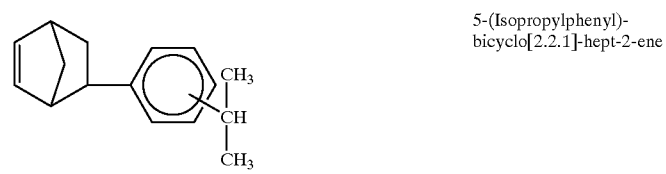
5-(Isopropylphenyl)-bicyclo[2.2.1]-hept-2-ene
1,4-Methano-1,4,4a,9a-tetrahydro-fluorene
1,4-Methano-1,4,4a,5,10,10a-hexahydroanthracene -continued
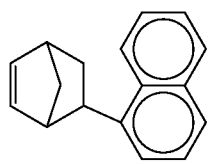
5-(α-Naphthyl)-bicyclo[2.2.1]hept-2-ene
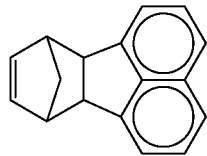
Cyclopentadiene-acenaphthylene adducts
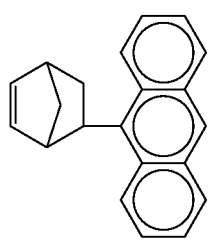
5-(Anthracenyl)-bicyclo[2.2.1]hept-2-ene
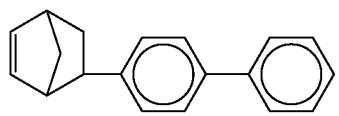
5-(Biphenyl)-bicyclo[2.2.1]hept-2-ene
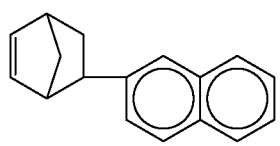
5-(β-Naphthyl)-bicyclo[2.2.1]hept-2-ene
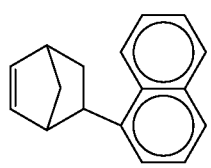
5-(α-Naphthyl)-bicyclo[2.2.1]hept-2-ene
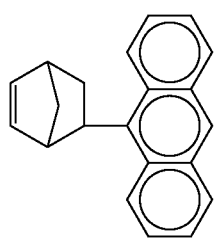
5-(Anthracenyl)-bicyclo[2.2.1]hept-2-ene
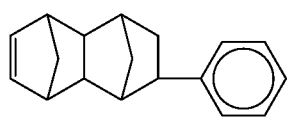
8-Phenyltetracyclo[4.4.0.1$^{2,5}$.1$^{7,10}$]-3-dodecene -continued

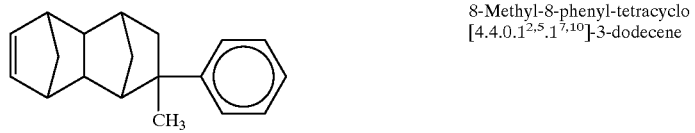
8-Methyl-8-phenyl-tetracyclo
[4.4.0.1$^{2,5}$.1$^{7,10}$]-3-dodecene

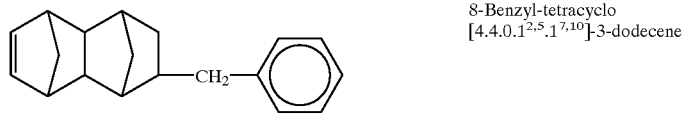
8-Benzyl-tetracyclo
[4.4.0.1$^{2,5}$.1$^{7,10}$]-3-dodecene

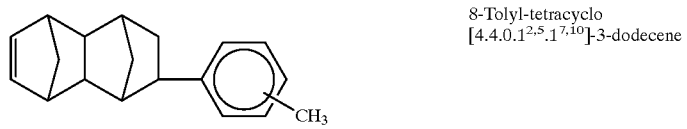
8-Tolyl-tetracyclo
[4.4.0.1$^{2,5}$.1$^{7,10}$]-3-dodecene

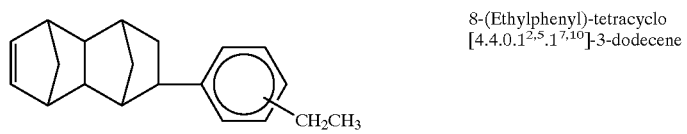
8-(Ethylphenyl)-tetracyclo
[4.4.0.1$^{2,5}$.1$^{7,10}$]-3-dodecene

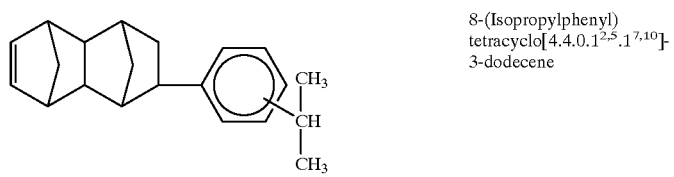
8-(Isopropylphenyl)
tetracyclo[4.4.0.1$^{2,5}$.1$^{7,10}$]-
3-dodecene

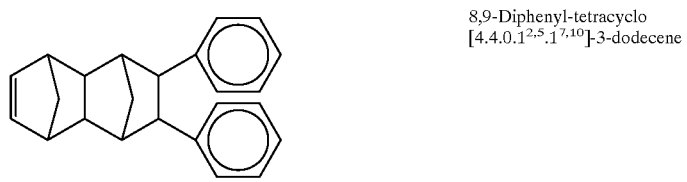
8,9-Diphenyl-tetracyclo
[4.4.0.1$^{2,5}$.1$^{7,10}$]-3-dodecene

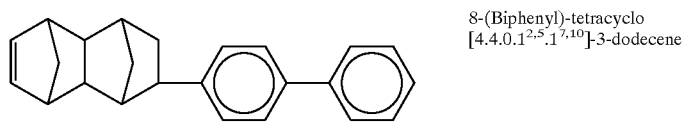
8-(Biphenyl)-tetracyclo
[4.4.0.1$^{2,5}$.1$^{7,10}$]-3-dodecene

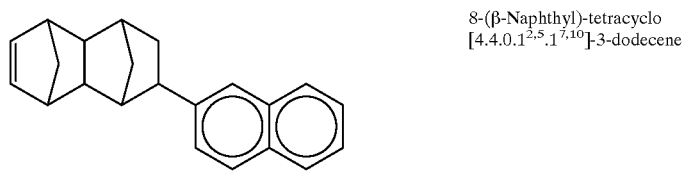
8-(β-Naphthyl)-tetracyclo
[4.4.0.1$^{2,5}$.1$^{7,10}$]-3-dodecene

8-(α-Naphthyl)-tetracyclo
[4.4.0.1$^{2,5}$.1$^{7,10}$]-3-dodecene

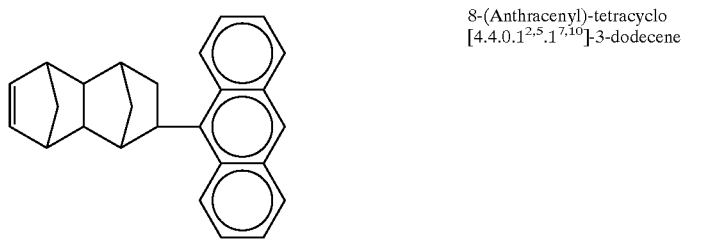
8-(Anthracenyl)-tetracyclo [4.4.0.1$^{2,5}$.1$^{7,10}$]-3-dodecene

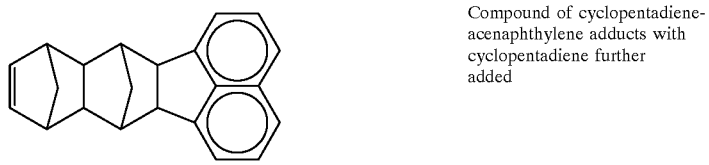
Compound of cyclopentadiene-acenaphthylene adducts with cyclopentadiene further added

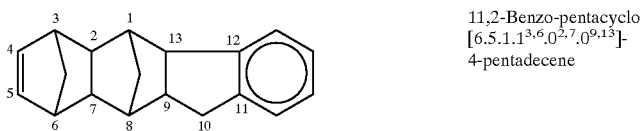
11,2-Benzo-pentacyclo [6.5.1.1$^{3,6}$.0$^{2,7}$.0$^{9,13}$]-4-pentadecene

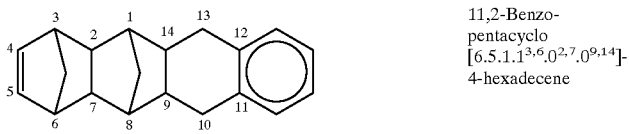
11,2-Benzo-pentacyclo [6.5.1.1$^{3,6}$.0$^{2,7}$.0$^{9,14}$]-4-hexadecene

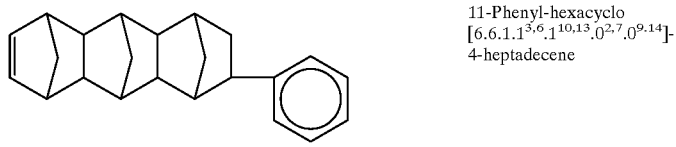
11-Phenyl-hexacyclo [6.6.1.1$^{3,6}$.1$^{10,13}$.0$^{2,7}$.0$^{9,14}$]-4-heptadecene

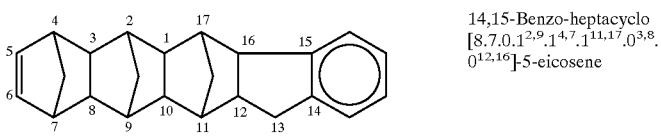
14,15-Benzo-heptacyclo [8.7.0.1$^{2,9}$.1$^{4,7}$.1$^{11,17}$.0$^{3,8}$.0$^{12,16}$]-5-eicosene

5,6-Diphenyl-bicyclo[2.2.1]hept-2-ene

Cyclopentadiene-acenaphthylene adducts

1,4-Methano-1,4,4a,9a-tetrahydro-fluorene

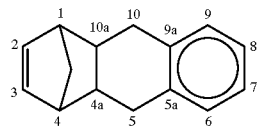

1,4-Methano-1,4,4a,5,10,10a-hexahydroanthracene

The cycloolefins represented by the formula [1] or [2] can be prepared by the Diels-Alder reaction of cyclopentadienes with olefins having the corresponding structures.

The cycloolefins can be used singly or in combination or more kinds.

The cycloolefin resins (a-1) to (a-2) employable in the invention can be prepared using the cycloolefins represented by the formula [1] or [2] under the properly selected conditions in accordance with, for example, the processes proposed by the present applicant in Japanese Laid-Open Publications No. 168708/1985, No. 120816/1986, No. 115912/1986, No. 115916/1986, No. 271308/1986, No. 272216/1986, No. 252406/1987, No. 252407/1987, No. 106/1989, No. 156308/1989 and No. 197511/1989.

(a-1) Ethylene/cycloolefin Random Copolymer

In the ethylene/cycloolefin random copolymer (a-1) used as the cycloolefin resin in the invention, the constituent units derived from ethylene are contained in amounts of usually 52 to 90% by mol, preferably 55 to 80% by mol, and the constituent units derived from the cycloolefin are contained in amounts of usually 10 to 48% by mol, preferably 20 to 45% by mol. The contents of the ethylene units and the cycloolefin units can be measured by $^{13}$C-NMR.

In the ethylene/cycloolefin random copolymer (a-1), the constituent units derived from ethylene and the constituent units derived from the cycloolefin are arranged at random and combined to form a substantially linear structure. The substantially linear and substantially crosslinked gel-free structure of this copolymer can be confirmed by the fact that the copolymer is dissolved in organic solvents and contains no insoluble component. For example, the above-mentioned structure can be confirmed by the fact that the copolymer is perfectly dissolved in decalin at 135° C. in the later-described measurement of the intrinsic viscosity [η] of the copolymer.

In the ethylene/cycloolefin random copolymer (a-1) used in the invention, at least a part of the constituent units derived from the cycloolefin represented by the formula [1] or [2] are considered to have a structure represented by the following formula [1-a] or [2-a]. Further, at least a part of the cycloolefin represented by the formula [1-1] preferably used in the invention is considered to have a structure represented by the following formula [1-1-a].

[1-a]

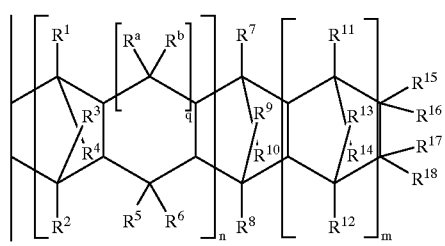

[2-a]

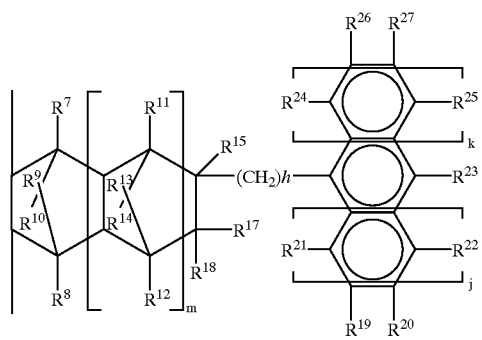

[1-1-a]

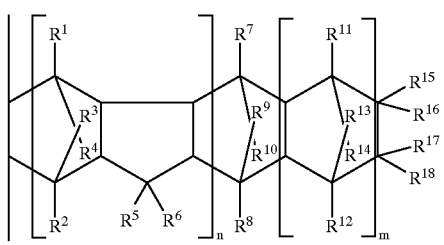

In the formulas [1-a] and [1-1-a], n, m, q, $R^1$ to $R^{18}$, $R^a$ and $R^b$ have the same meanings as in the formula [1]. In the formula [2-a], m, h, j, k, $R^7$ to $R^{15}$, and $R^{17}$ to $R^{27}$ have the same meanings as in the formula [2].

In the ethylene/cycloolefin random copolymer (a-1) used in the invention, constituent units derived from other copolymerizable monomers may be contained, if necessary, within limits not prejudicial to the objects of the invention.

Examples of the monomers include olefins other than ethylene and the above-mentioned cycloolefins, norbornenes and nonconjugated dienes. More specifically, there can be mentioned:

α-olefins of 3 to 20 carbon atoms, such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene;

cycloolefins, such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;

norbornenes, such as 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and nonconjugated dienes, such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

These monomers can be used singly or in combination of two or more kinds.

In the ethylene/cycloolefin random copolymer (a-1), the constituent units derived from the other monomers may be contained in amounts of usually not more than 20% by mol, preferably not more than 10% by mol.

The ethylene/cycloolefin random copolymer (a-1) for use in the invention can be prepared using ethylene and the cycloolefin represented by the formula [1] or [2] in accordance with the processes disclosed in the aforesaid publications. Above all, it is preferable to prepare the ethylene/cycloolefin random copolymer (a-1) by a process in which the copolymerization is carried out in a hydrocarbon solvent, using, as catalyst, either a vanadium catalyst formed from a vanadium compound soluble in the hydrocarbon solvent and an organoaluminum compound, a titanium catalyst formed from a titanium compound and an organoaluminum compound or a zirconium catalyst formed from aluminoxane and a zirconium complex having as a ligand a multidentate coordination compound wherein at least two conjugated cycloalkadienyl groups are linked through a lower alkylene group.

(a-2) Graft Modified Product

The graft modified product (a-2) of a cycloolefin resin used in the invention is obtained by graft modifying a part of the ethylene/cycloolefin random copolymer (a-1) with a modifier.

Examples of the modifiers used herein include unsaturated carboxylic acids, anhydrides of these acids such as maleic anhydride, and derivatives of alkyl esters of unsaturated carboxylic acids.

In the graft modified product employable as the cycloolefin resin in the invention, the content of the constituent units derived from the modifier is usually not more than 10% by mol.

The graft modified product of a cycloolefin resin can be prepared by blending a cycloolefin resin with a modifier to perform graft polymerization in such a manner that the desired degree of modification is obtained, or it can be prepared by previously preparing a modified product having a high degree of modification and mixing the modified product and an unmodified cycloolefin resin.

The cycloolefin resin for use in the invention is selected from the group consisting of the ethylene/cycloolefin random copolymer (a-1) and the graft modified product (a-2). A mixture of two or more kinds thereof is also employable.

Of these, the ethylene/cycloolefin random copolymer (a-1) is preferably employed as the cycloolefin resin in the invention.

Cycloolefin Resin Composition

The multi-layer laminate of the invention may be a laminate of (A) a layer formed from the cycloolefin resin and (B) a polymer layer having the later-described specific oxygen permeability, but the cycloolefin resin layer (A) may be formed from a cycloolefin resin composition.

That is, this cycloolefin resin composition layer is formed from a composition comprising at least one cycloolefin resin selected from the group consisting of the ethylene/cycloolefin random copolymer (a-1) and the graft modified product (a-2) and (b) a polyolefin.

As the polyolefin (b), a (co)polymer of an α-olefin of 2 to 20 carbon atoms is usually employed.

Examples of the α-olefins of 2 to 20 carbon atoms include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

The polyolefin (b) used in the invention may be a homopolymer of the α-olefin or a copolymer of two or more kinds of the α-olefins.

In the polyolefin (b), the α-olefins mentioned above may be copolymerized with other monomers such as norbornenes and nonconjugated dienes, as far as the properties of the polyolefin are not marred. Examples of the other monomers include:

cycloolefins, such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene;

norbornenes, such as 2-norbornene, 5-methyl-2-norbornene, 5-ethyl-2-norbornene, 5-isopropyl-2-norbornene, 5-n-butyl-2-norbornene, 5-isobutyl-2-norbornene, 5,6-dimethyl-2-norbornene, 5-chloro-2-norbornene and 5-fluoro-2-norbornene; and nonconjugated dienes, such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene.

These monomers can be used singly or in combination of two or more kinds.

In the present invention, the polyolefin (b) is preferably polyethylene and/or polypropylene.

When the polyolefin (b) is polyethylene, this polyethylene may be a homopolymer of ethylene or a copolymer of ethylene and other α-olefin.

For example, if the polyolefin (b) is polyethylene, an ethylene homopolymer or an ethylene/α-olefin copolymer having an ethylene content of not less than 60% by mol, preferably not less than 70% by mol, each of which has a density of usually not less than 0.830 g/cm$^3$, preferably 0.87 to 0.94 g/cm$^3$, a melt flow rate at 190° C. of usually 0.01 to 100 g/10 min, preferably 0.03 to 50 g/10 min, and a Vicat softening point of usually 50 to 140° C., preferably 80 to 130° C., is used as the polyethylene.

Examples of the α-olefins copolymerizable with ethylene include α-olefins of 3 to 14 carbon atoms, such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene. Of these, α-olefins of 3 to 10 carbon atoms are preferably employed.

When the polyolefin (b) is polypropylene, this polypropylene may be a homopolymer of propylene or a copolymer of propylene and other α-olefin.

If the polyolefin (b) is polypropylene, a propylene homopolymer or a propylene/α-olefin copolymer having a propylene content of not less than 70% by mol, preferably not less than 80% by mol, each of which has a density of usually not less than 0.85 g/cm$^3$, preferably 0.89 to 0.91 g/cm$^3$, a melt flow rate at 230° C. of usually 0.01 to 100 g/10 min, preferably 0.05 to 100 g/10 min, and a Vicat softening point of usually 100 to 170° C., preferably 110 to 160° C., is used as the polypropylene.

Examples of the α-olefins copolymerizable with propylene include α-olefins of 2 to 14 carbon atoms (excluding propylene), such as ethylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene and 1-tetradecene. Of these, α-olefins of 2 to 10 carbon atoms (excluding propylene) are preferably employed.

The polyolefin (b) may be a graft modified product. Examples of the modifiers used herein include unsaturated carboxylic acids, anhydrides of these acids such as maleic anhydride, and derivatives of alkyl esters of unsaturated carboxylic acids.

When the polyolefin (b) is a graft modified product, the content of the constituent units derived from the modifier in the polyolefin (b) is usually not more than 10% by mol.

The graft modified product can be prepared by blending a polyolefin with a modifier to perform graft polymerization in such a manner that the desired degree of modification is obtained, or it can be prepared by previously preparing a modified product having a high degree of modification and mixing the modified product and an unmodified polyolefin.

The cycloolefin resin composition can be prepared from the polyolefin and the cycloolefin resin by mixing them in accordance with known methods. For example, those components are mixed by means of a Henschel mixer, a V-blender, a ribbon blender, a tumbling blender or the like. Or, after mixing, the resulting mixture is further melt kneaded by means of a single-screw extruder, a twin-screw extruder, a kneader or the like, followed by granulating or pulverizing the kneadate.

To the cycloolefin resin or cycloolefin resin composition (A) used in the invention, rubber components to improve impact strength, other resin components, heat stabilizers, weathering stabilizers, light stabilizers, antistatic agents, slip agents, anti-blocking agents, anti-fogging agents, nucleating agents, lubricants, dyes which absorb only the lights of specific wavelength, pigments, natural oils, synthetic oils, waxes and light transmitting fillers may be added within limits not prejudicial to the objects of the invention, in addition to the components (a-1), (a-2) and (b).

Examples of the stabilizers optionally added include phenol antioxidants, such as tetrakis[methylene-3(3,5-di-t-butyl-4-hydroxyphenyl)propionate]methane, alkyl ester of β(3,5-di-t-butyl-4-hydroxyphenyl)propionic acid and 2,2'-oxamidobis[ethyl-3-(3,5-di-t-butyl-4-hydroxyphenyl) propionate]; metallic salts of fatty acids, such as zinc stearate and calcium salts of fatty acids (e.g., calcium stearate and calcium 12-hydroxystearate); and fatty acid esters of polyhydric alcohols.

These stabilizers may be added singly or in combination. For example, a combination of tetrakis[methylene-3(3,5-di-t-butyl-4-hydroxyphenyl)propionate]methane, zinc stearate and glycerol monostearate is employable.

In the present invention, it is preferable to use phenol antioxidants and fatty acid esters of polyhydric alcohols in combination. Examples of the fatty acid esters of polyhydric alcohols include those wherein a part of alcoholic hydroxyl groups of the tri- or more-valent polyhydric alcohols are esterified.

Examples of the fatty acid esters of polyhydric alcohols include:

fatty acid esters of glycerol, such as glycerol monostearate, glycerol monolaurate, glycerol monomyristate, glycerol monopalmitate, glycerol distearate and glycerol dilaurate; and fatty acid esters of pentaerythritol, such as pentaerythritol monostearate, pentaerythritol monolaurate, pentaerythritol distearate and pentaerythritol tristearate.

These esters may be used singly or in combination.

The phenol antioxidant is used in an amount of usually less than 10 parts by weight, preferably less than 5 parts by weight, more preferably less than 2 parts by weight, based on 100 parts by weight of the total of the essential components. The fatty acid ester of polyhydric alcohol is used in an amount of usually less than 10 parts by weight, preferably less than 5 parts by weight, based on 100 parts by weight of the total of the essential components.

(B) Polymer Layer of Low Oxygen Permeability

The multi-layer laminate of the invention is a laminate comprising (A) a layer formed from the cycloolefin resin or the cycloolefin resin composition and (B) a polymer layer having a specific oxygen permeability.

The polymer layer (B) needs to have an oxygen permeability, as measured at a temperature of 23° C. and RH of 0%, of not more than 10 cc(STP).mm/m$^2$.24 hr.atm, and the oxygen permeability of the polymer layer (B) is preferably not more than 1 cc(STP).mm/m$^2$.24 hr.atm, more preferably not more than 0.1 cc(STP).mm/m$^2$.24 hr.atm.

The polymer layer having an oxygen permeability in this range can be formed from various resins. Examples of the resins for forming the polymer layer (B) include an ethylene/vinyl alcohol copolymer (EVOH), polyacrylonitrile (PAN), polyvinylidene chloride (PVDC) and cellophane. In the invention, the polymer layer is preferably formed from the ethylene/vinyl alcohol copolymer (EVOH) or cellophane.

The ethylene/vinyl alcohol copolymer (EVOH) used in the invention is preferably a copolymer having a saponification degree of 90 to 100%, which is obtained by saponifying an ethylene/vinyl acetate copolymer having an ethylene content of 15 to 60% by mol. An ethylene/vinyl alcohol copolymer having an ethylene content of less than 15% by mol is sometimes difficult to mold it because its molding temperature is close to its decomposition temperature. If the ethylene content exceeds 60% by mol, resistance to gas permeation and mechanical properties, which are excellent characteristics of an ethylene/vinyl alcohol copolymer, deteriorate and the resulting laminate does not exert effects of the laminated structure. An ethylene/vinyl alcohol copolymer having a saponification degree of less than 90% sometimes show poor mechanical properties, oil resistance and water resistance, so that the saponification degree in the ethylene/vinyl alcohol copolymer (EVOH) is usually determined within the above-mentioned range. The ethylene/vinyl alcohol copolymer (EVOH) has an oxygen permeability of usually not more than 10 cc(STP).mm/m$^2$.24 hr.atm, and therefore this copolymer is suitable for forming the multi-layer laminate of the invention.

The cellophane preferably used is one having a regenerated cellulose content of not less than 65%.

To the polymer layer (B) of low oxygen permeability, other various components, such as rubber components to improve impact strength, other resin components, heat stabilizers, weathering stabilizers, light stabilizers, antistatic agents, slip agents, anti-blocking agents, anti-fogging gents, nucleating agents, lubricants, dyes which absorb only the lights of specific wavelength, pigments, natural oils, synthetic oils, waxes and light transmitting fillers, may be added within limits not prejudicial to the objects of the invention.

Multi-layer Laminate

The multi-layer laminate of the invention is a laminate of (A) the layer of the cycloolefin resin or the cycloolefin resin composition and (B) the polymer layer. The laminate can take any optional laminating structure, such as:

polymer layer (B)/cycloolefin resin (composition) layer (A)/polymer layer (B);

cycloolefin resin (composition) layer (A)/polymer layer (B)/cycloolefin resin (composition) layer (A); or polymer layer (B)/cycloolefin resin (composition) layer (A).

The multi-layer laminate of the invention comprising the layer (A) and the layer (B) has an oxygen permeability of not more than 5 cc(STP).mm/m².24 hr.atm, preferably not more than 1 cc(STP).mm/m².24 hr.atm, more preferably not more than 0.5 cc(STP).mm/m².24 hr.atm.

A layer of polyolefin such as polyethylene or polypropylene can be further laminated as the outermost layer of the laminate of the invention to improve heat-sealing properties of a molded product in the form of sheet or film.

In the multi-layer laminate of the invention, the thickness of the cycloolefin resin (composition) layer (A) and the thickness of the low-oxygen permeability polymer layer (B) can be properly determined in consideration of uses of the multi-layer laminate, but in general, the thickness of the cycloolefin resin (composition) layer (A) is in the range of 1 μm to 10 mm, and the thickness of the low-oxygen permeability polymer layer (B) is in the range of 1 μm to 10 mm. The total thickness of the multi-layer laminate of the invention is generally in the range of 2 μm to 20 mm, though it varies depending on the uses of the laminate, the number of the laminated layers, etc.

The cycloolefin resin (composition) layer and the low-oxygen permeability polymer layer (B) can be laminated together without using any adhesive. For example, they can be laminated in accordance with the methods conventionally used for forming multi-layer laminates, specifically, co-extrusion methods such as a multi-layer T-die method, a multi-layer inflation method and an extrusion laminating method. The cycloolefin resin (composition) layer (A) and the low-oxygen permeability polymer layer (B) show good adhesion therebetween, so that it is unnecessary to use any adhesive. However, if the resin for forming the layer (A) and the resin for forming the layer (B) have low affinity for each other, those layers can be laminated by using an adhesive.

The adhesive preferably used in the invention is, for example, a low-crystalline to non-crystalline soft copolymer or a soft copolymer composition containing the soft copolymer.

As the low-crystalline to non-crystalline soft copolymer, an adhesive resin composition containing modified polyolefin or unsaturated polyolefin is employable. The modified polyolefin is prepared from an ethylene/α-olefin random copolymer having a melt flow rate (MFR), as measured in accordance with ASTM D 1238L, of usually 0.1 to 50 g/10 min, preferably 0.2 to 20 g/10 min, a density of usually 0.850 to 0.900 g/cm³, preferably 0.855 to 0.895 g/cm³, an ethylene content of 30 to 95% by mol, preferably 40 to 92% by mol, a crystallinity, as measured by X-ray diffractometry, of usually not more than 40%, preferably not more than 30%, and a melting point, as measured in accordance with ASTM D 3418, of usually not higher than 100° C.

In the present invention, the low-crystalline to non-crystalline soft copolymer can be used alone as the adhesive, or it can be used after mixed with a tackifier or the like.

As the tackifier, an aliphatic hydrocarbon resin and/or an alicyclic hydrocarbon resin obtained by hydrogenating an aromatic hydrocarbon resin is employable. Particularly, an alicyclic hydrocarbon resin having a softening point, as measured by a ring and ball method, of usually 105 to 150° C., preferably 110 to 140° C., and a hydrogenation degree of aromatic ring of usually not less than 80%, preferably not less than 85%, is employed. In this case, the ethylene/α-olefin copolymer is used in an amount of 60 to 98% by weight, and the aliphatic hydrocarbon resin and/or the alicyclic hydrocarbon resin is used in an amount of 2 to 40% by weight.

The low-crystalline to non-crystalline soft copolymer can be blended with modified polyethylene. The modified polyethylene has a graft amount of the unsaturated carboxylic acid or its derivative of 0.01 to 10% by weight, preferably 0.1 to 5% by weight, a density of 0.905 to 0.98 g/cm³, preferably 0.920 to 0.970 g/cm³, and a crystallinity, as measured by X-ray diffractometry, of not less than 45%, preferably 50 to 80%. In order to prepare the modified polyethylene, an ethylene homopolymer or an ethylene copolymer each having a melt flow rate (MFR, ASTM D 1238E) of 0.001 to 100 g/10 min, a density of 0.905 to 0.980 g/cm³, and a crystallinity, as measured by X-ray diffractometry, of not less than 45% may be employed.

Examples of the unsaturated carboxylic acids and their derivatives used for the modification include unsaturated carboxylic acids, such as acrylic acid, maleic acid, fumaric acid, tetrahydrophthalic acid, itaconic acid, citraconic acid, crotonic acid, isocrotonic acid and Nadic acid™ (endocis-bicyclo[2,2,1]hepto-5-ene-2,3-dicarboxylic acid); and derivatives of these acids, such as malenyl chloride, maleimide, maleic anhydride, citraconic anhydride, monomethyl maleate, dimethyl maleate and glycidyl maleate. Of these, preferable are maleic acid, Nadic acid™ and anhydrides thereof.

The modified polyethylene is used in an amount of usually 0.1 to 99% by weight based on 100 parts by weight of the low-crystalline to non-crystalline soft copolymer.

The soft copolymer composition may be a blend of the above-mentioned ethylene/α-olefin random copolymer and an ethylene/vinyl acetate random copolymer and/or an ethylene/vinyl alcohol random copolymer. In this case, it is preferred that the ethylene/α-olefin random copolymer is used in an amount of 60 to 98% by weight, and the ethylene/vinyl acetate random copolymer and/or the ethylene/vinyl alcohol random copolymer is used in an amount of 2 to 40% by weight.

The multi-layer laminate of the invention can be prepared by various methods, for example, co-extrusion methods, such as multi-layer T-die method, multi-layer inflation and extrusion laminating method; multi-layer sheet- or film-forming methods conventionally known, such as wet laminating method and dry laminating method; blow methods, such as multi-layer injection blowing (e.g., co-injection blowing) and multi-layer direct blowing; injection molding methods, such as sandwich molding and two-color injection molding; and stamping method. The multi-layer laminate thus produced can be used as it is without being stretched, or it can be used after monoaxially stretched or biaxially oriented. In order to impart other functions, the multi-layer laminate may further be provided with a coat of vinylidene chloride or a film of other resin.

Uses

The multi-layer laminate of the invention is excellent not only in gas barrier properties such as oxygen barrier properties, interlaminar bond properties, moisture resistance, transparency, moderate flexibility, tearability, heat-sealing properties and dead fold properties but also in vacuum or pressure formability, so that it exerts effects high enough as materials for packaging drugs, foods and cigarettes. Accordingly, the multi-layer laminate of the invention can be suitably used as a material of packaging sheets, packaging films or containers such as bottles.

Examples of the objects to be packaged include drugs, foods, daily necessaries, general merchandise and other optional goods. Especially when the multi-layer laminate of the invention is used for packaging drugs such as tablet or capsule drugs, foods such as rice crackers, snack foods and cookies, and hygroscopic goods such as cigarettes and tea bags, the moisture resistance and transparency can be ensured.

Examples of the applicable packaging materials include films of bags, packs, PTP (press through pack) and blister packs, twist wrapping films, wrapping films, shrink films, easy peel films, medical containers such as eye-droppers, vials, transfusion packs and syringes, physiochemical containers such as petri dishes, test tubes and analytical cells, and containers made up of multi-layer molded sheets such as cosmetic bottles, tetra packs and milk packs.

The multi-layer laminate of the invention is particularly suitable as a packaging material such as PTP (press through pack) or blister pack.

EFFECT OF THE INVENTION

The multi-layer laminate of the invention comprises a layer of a specific cycloolefin resin or a specific cycloolefin resin composition and a polymer layer having a low oxygen permeability, so that it is excellent not only in interlaminar bond properties, formability, moisture resistance, transparency, moderate flexibility, tearability, heat-sealing properties and dead fold properties but also in vacuum or pressure formability. The polymer layer (B) of the multi-layer laminate of the invention has a low oxygen permeability. Therefore, use of sheets, films or packaging materials formed from the laminate of the invention makes it possible to favorably seal the objects packaged. The multi-layer laminate of the invention is not lowered in the gas barrier properties, and exhibits excellent gas barrier properties even when it is used in an atmosphere of high humidity. That is, the multi-layer laminates shown in Comparative Examples 6 and 7 are markedly lowered in the moisture resistance when used in an atmosphere or high humidity, though they are not so bad in the moisture resistance and gas barrier properties as compared with the multi-layer laminate of the invention. On the other hand, the multi-layer laminate of the invention does not have such unfavorable tendency, and it is particularly excellent in the moisture resistance and gas barrier properties under the wet conditions.

EXAMPLE

The present invention will be further described with reference to the following examples, but it should be construed that the invention is in no way limited to those examples.

Example 1

As a cycloolefin resin composition, a random copolymer of ethylene (intrinsic viscosity [η]: 0.67 dl/g, softening temperature (TMA): 90° C.) and tetracyclo[4.4.0.1$^{2,5}$.1$^{7,10}$]-3-dodecene (hereinafter sometimes referred to as "ETCD") was melted in an extruder. The molten copolymer was fed to a composite inflation molding die at a resin temperature of 210° C.

Separately, an ethylene/vinyl alcohol copolymer (EVOH, trade name: Kuraray Eval EP-F, ethylene content: 32% by mol, density: 1.19, oxygen permeability: 0.05 cc.mm/m$^2$.24 hr.atm, available from Kuraray Co., Ltd.) was melted in a different extruder. The molten resin was fed to the die at a resin temperature of 210° C., to prepare an inflation film consisting of an ETCD layer as an inner layer and an ethylene/vinyl alcohol copolymer (EVOH) layer as an outer layer.

In the inflation film, the ETCD layer had a thickness of 70 μm, and the ethylene/vinyl alcohol copolymer (EVOH) layer had a thickness of 30 μm.

The film was evaluated on the gas barrier properties, and the results are set forth in Table 1.

Comparative Example 1

As a cycloolefin resin composition, a random copolymer (ETCD) of ethylene (intrinsic viscosity [η]: 0.67 dl/g, softening temperature (TMA): 90° C.) and tetracyclo[4.4.0.1$^{2,5}$.1$^{7,10}$]-3-dodecene was melted in an extruder. The molten copolymer was fed to a composite inflation molding die at a resin temperature of 210° C.

Separately, nylon-6 (trade name: Toray Amiran CM1011, oxygen permeability: 1.2 cc.mm/m$^2$.24 hr.atm, available from Toray Industries, Inc.) was melted in a different extruder. The molten resin was fed to the die at a resin temperature of 260° C., to prepare an inflation film consisting of an ETCD layer as an inner layer and a nylon-6 layer as an outer layer.

In the inflation film, the ETCD layer had a thickness of 70 μm, and the nylon-6 layer had a thickness of 30 μm.

The film was evaluated on the gas barrier properties, and the results are set forth in Table 1.

Comparative Example 2

An inflation film was prepared in the same manner as in Comparative Example 1 except that polyethylene terephthalate (PET, intrinsic viscosity: 1.4 dl/g, oxygen permeability: 5.0 cc.mm/m$^2$.24 hr.atm) was used in place of nylon-6 and the molten resin was fed to the die at a resin temperature of 270° C.

The film was evaluated on the gas barrier properties, and the results are set forth in Table 1.

Example 2

An inflation film was prepared in the same manner as in Comparative Example 1 except that PVDC (vinylidene chloride content: 85% by mol, oxygen permeability: 0.3 cc.mm/m$^2$.24 hr.atm) was used in place of nylon-6 and the molten resin was fed to the die at a resin temperature of 200° C.

The film was evaluated on the gas barrier properties, and the results are set forth in Table 1.

Example 3

An inflation film was prepared in the same manner as in Comparative Example 1 except that polyacrylonitrile (PAN, trade name: Balex, oxygen permeability: 0.7 cc.mm/m$^2$.24 hr.atm) was used in place of nylon-6 and the molten resin was fed to the die at a resin temperature of 210° C.

The film was evaluated on the gas barrier properties, and the results are set forth in Table 1.

Example 4

As a cycloolefin resin composition, a random copolymer (ETCD-2) of ethylene (intrinsic viscosity [η]: 0.60 dl/g, softening temperature (TMA): 150° C.) and tetracyclo [$4.4.0.1^{2,5}.1^{7,10}$]-3-dodecene was melted in an extruder. The molten copolymer was fed to a composite inflation molding die at a resin temperature of 270° C.

Separately, an ethylene/vinyl alcohol copolymer (EVOH, trade name: Kuraray Eval EP-F, ethylene content: 32% by mol, density: 1.19 g/cm$^3$, oxygen permeability: 0.05 cc.mm/ m$^2$.24 hr.atm, available from Kuraray Co., Ltd.) was melted in a different extruder. The molten resin was fed to the die at a resin temperature of 230 ° C., to prepare an inflation film consisting of an ETCD-2 layer as an inner layer and an ethylene/vinyl alcohol copolymer (EVOH) layer as an outer layer.

In the inflation film, the ETCD-2 layer had a thickness of 70 μm, and the ethylene/vinyl alcohol copolymer (EVOH) layer had a thickness of 30 μm.

The film was evaluated on the gas barrier properties, and the results are set forth in Table 2.

Comparative Example 3

An inflation film was prepared in the same manner as in Comparative Example 1 except that polyethylene (MFR: 5.2 g/10 min (190 ° C., 2.16 kg), density: 0.968 g/cm$^3$, oxygen permeability: 85 cc.mm/m$^2$.24 hr.atm) was used in place of nylon-6 and the molten resin was fed to the die at a resin temperature of 210° C.

The film was evaluated on the gas barrier properties, and the results are set forth in Table 1.

Comparative Example 4

An inflation film was prepared in the same manner as in Comparative Example 1 except that polypropylene (MFR: 7.0 g/10 min (230 ° C., 2.16 kg), melting point: 143 ° C., oxygen permeability: 80 cc.mm/m$^2$.24 hr.atm) was used in place of nylon-6 and the molten resin was fed to the die at a resin temperature of 210° C.

The film was evaluated on the gas barrier properties, and the results are set forth in Table 1.

Comparative Example 5

An inflation film having a thickness of 100 Am was prepared by the use of ETCD alone.

The film was evaluated on the gas barrier properties, and the results are set forth in Table 1.

Comparative Example 6

An inflation film was prepared in the same manner as in Example 1 except that polypropylene (MFR: 7.0 g/10 min (230° C., 2.16 kg), Tm: 143° C., oxygen permeability: 80 cc.mm/m$^2$.24 hr.atm) was used in place of ETCD.

The film was evaluated on the gas barrier properties, and the results are set forth in Table 2.

Comparative Example 7

An inflation film was prepared in the same manner as in Example 1 except that polyethylene (MFR: 5.2 g/10 min (190° C., 2.16 kg), density: 0.968 g/cm$^3$, oxygen permeability: 85 cc.mm/m$^2$.24 hr.atm) was used in place of ETCD.

The film was evaluated on the gas barrier properties, and the results are set forth in Table 2.

Comparative Example 8

An inflation film having a thickness of 100 μm was prepared by the use of EVOH alone. The film was evaluated on the gas barrier properties, and the results are set forth in Table 1.

As is obvious from the comparison between Comparative Examples 6, 7 and Example 1, the laminated film consisting of the ETCD layer and the EVOH layer has both of the gas barrier properties inherent in EVOH and the moisture resistance inherent in ETCD.

Comparative Example 9

Molding was carried out in the same manner as in Example 4 except that a hydrogenation product (ring opening polymer A) of an tetracyclododecene ring opening polymer having an intrinsic viscosity [η] of 0.06 dl/g and a softening temperature of 150° C. was used as a cycloolefin resin.

The gas barrier properties of the film obtained are set forth in Table 2.

TABLE 1

| | Ex. 1 | Comp. Ex. 1 | Comp. Ex. 2 | Ex. 2 | Ex. 3 | Comp. Ex. 3 | Comp. Ex. 4 | Comp. Ex. 5 |
|---|---|---|---|---|---|---|---|---|
| Layer structure | ETCD/ EVOH | ETCD/ NY6 | ETCD/ PET | ETCD/ PVDC | ETCD/ PAN | ETCD/ PE | ETCD/ PP | ETCD |
| Thickness of each layer (μm) | 70/30 | 70/30 | 70/30 | 70/30 | 70/30 | 70/30 | 70/30 | |
| Moisture permeability *1) | 0.12 | 0.13 | 0.13 | 0.11 | 0.13 | 0.12 | 0.12 | 0.09 |
| Oxygen permeability of layer A + layer B *2) | 0.17 | 35 | 11 | 0.97 | 0.94 | 32 | 31 | 25 |
| Carbon dioxide gas permeability *2) | 0.50 | 14 | 32 | 7.6 | 3.2 | 79 | 79 | 60 |
| Oxygen permeability of layer B alone *2) | 0.05 | 1.2 | 5.0 | 0.3 | 0.7 | 85 | 80 | (25) |

Remarks:
*1) g · mm/m$^2$ · 24 hr
*2) cc (STP) · mm/m$^2$ · 24 hr · atm

TABLE 2

|  | Ex. 1 | Ex. 4 | Comp. Ex. 6 | Comp. Ex. 7 | Comp. Ex. 8 | Comp. Ex. 9 | Comp. Ex. 5 |
|---|---|---|---|---|---|---|---|
| Layer structure | ETCD/ EVOH | ETCD-2/ EVOH | PP *3)/ EVOH | PE *4)/ EVOH | EVOH single layer | Ring opening polymer A | ETCD single layer |
| Thickness of each layer (μm) | 70/30 | 70/30 | 70/30 | 70/30 | 100 | 70/30 | 100 |
| Moisture permeability *1) | 0.12 | 0.12 | 0.37 | 0.26 | 0.75 | 0.30 | 0.09 |
| Oxygen permeability of layer A + layer B *2) | 0.17 | 0.17 | 0.17 | 0.17 | 0.17 | 0.17 | 25 |
| Carbon dioxide gas permeability *2) | 0.50 | 0.05 | 0.53 | 0.53 | 0.16 | 0.15 | 60 |

Remarks:
*1) g · mm/m² · 24 hr
*2) cc (STP) · mm/m² · 24 hr · atm
*3) PP:MFR = 7.0 g/10 min, Tm = 143° C., O₂ permeability = 80 cc (STP) · mm/m² · 24 hr · atm
*4) PE:MFR = 5.2 g/10 min. (190° C., 2.16 kg) Density = 0.968, O₂ permeability = 85 cc (STP) · mm/m² · 24 hr · atm

What is claimed is:

1. A multi-layer laminate consisting essentially of:
   (A) a layer consisting essentially of at least one cycloolefin resin selected from the group consisting of
     (a-1) an ethylene/cycloolefin random copolymer comprising constituent units derived from cycloolefin represented by the following formula (1) or (2) and constituent units derived from ethylene and
     (a-2) a graft modified product of the ethylene/cycloolefin random copolymer (a-1), or
     a layer consisting essentially of a cycloolefin resin composition consisting essentially of at least one cycloolefin resin selected from the group consisting of the ethylene/cycloolefin random copolymer (a-1) and the graft modified product (a-2), and (b) a polyolefin, and
   (B) a barrier layer consisting essentially of ethylene/vinyl alcohol copolymer (EVOH), polyvinylidene chloride (PVDC) or polyacrylonitrile (PAN), and having an oxygen permeability, as measured at a temperature of 23° C. and RH of 0%, of not more than 10 cc(SPT).mm/m².24 hr.atm,
   said multi-layer laminate having a moisture permeability of not more than 0.2 g.mm/m².24 hr.atm and an oxygen permeability of not more than 5 cc(STP).mm/m².24 hr.atm;

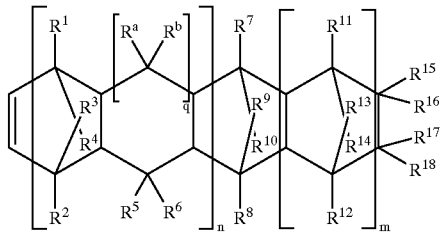

[1]

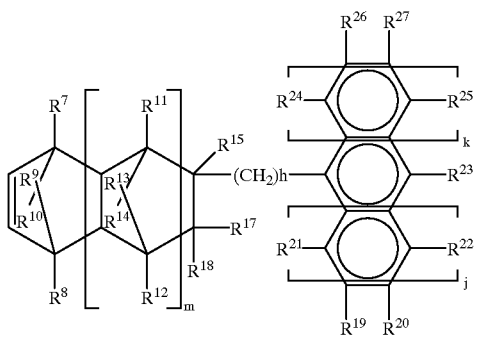

[2]

wherein m is 0 or a positive integer; h is 0 or a positive integer; i and k are each 0, 1 or 2; $R^7$ to $R^{15}$ and $R^{17}$ to $R^{18}$ are each independently an atom or a group selected from the group consisting of a hydrogen atom, a halogen atom and a hydrocarbon group; and $R^{19}$ to $R^{27}$ are each independently an atom or a group selected from the group consisting of a hydrogen atom, a halogen atom, a hydrocarbon group and an alkoxy group.

2. The multi-layer laminate as claimed in claim 1, wherein the oxygen permeability of the multi-layer laminate is not more than 1 cc(STP).mm/m².24 hr.atm.

3. The multi-layer laminate as claimed in claim 1, wherein the oxygen permeability of the multi-layer laminate is not more than 0.5 cc(STP).mm/m².24 hr.atm.

4. The polyolefin multi-layer laminate as claimed in claim 1, wherein the cycloolefin random copolymer (a-1) and its graft modified product (a-2) have an intrinsic viscosity [η], as measured at 135° C., of 0.01 to 10 dl/g and a softening temperature (TMA) of not lower than 50° C.

5. The multi-layer laminate as claimed in claim 1, wherein the cycloolefin resin is the ethylene/cycloolefin random copolymer (a-1).

6. A container or a packaging material comprising the multi-layer laminate as claimed in claim 1.

7. The container or the packaging material as claimed in claim 7, wherein the packaging material is a press-through pack or a blister pack.

8. The container or the packaging material as claimed in claim 7, wherein the packaging material is a packaging material for foods.

wherein n is 0 or 1; m is 0 or a positive integer; q is 0 or 1; $R^1$ to $R^{18}$, $R^a$ and $R^b$ are each independently an atom or a group selected from the group consisting of a hydrogen atom, a halogen atom and a hydrocarbon group; $R^{15}$ to $R^{18}$ may be bonded to each other to form a single ring or plural rings each of which may have a double bond; $R^{15}$ and $R^{16}$, or $R^{17}$ and $R^{18}$ may form an alkylidene group; and when q is 0, the bonding hands are bonded to each other to form a five-membered ring;

9. A sheet or a film comprising the multi-layer laminate as claimed in any one of claims 1–5.

10. A multi-layer laminate consisting essentially of
   (A) a layer of ethylene/tetracyclo $(4.4.0.1^{2,5}.1^{7,10})$-3-dodecene random copolymer (ETCD) and
   (B) a barrier layer consisting essentially of ethylene/vinyl alcohol copolymer (EVOH), polyvinylidene chloride (PVDC) or polyacrylonitrile (PAN), and having an oxygen permeability, as measured at a temperature of 23° C. and RH of 0%, of not more than 10 cc(STP). mm/m².24 hr.atm,
   said multi-layer laminate having a moisture permeability of not more than 0.2 g.mm/m².24 hr.atm and an oxygen permeability of not more than 5 cc(STP).mm/m².24 hr.atm.

11. A multi-layer laminate consisting essentially of:
   (A) a layer consisting essentially of at least one cycloolefin resin selected from the group consisting of
      (a-1) an ethylene/cycloolefin random copolymer comprising constituent units of cycloolefin represented by the following formula (1-a) or (2-a) and constituent units from ethylene and
      (a-2) a graft modified product of the ethylene/cycloolefin random copolymer (a-1), or
      a layer consisting essentially of a cycloolefin resin composition consisting essentially of at least one cycloolefin resin selected from the group consisting of the ethylene/cycloolefin random copolymer (a-1) and the graft modified product (a-2), and (b) a polyolefin, and
   (B) a barrier layer consisting essentially of ethylene/vinyl alcohol copolymer (EVOH), polyvinylidene chloride (PVDC) or polyacrylonitrile (PAN), and having an oxygen permeability, as measured at a temperature of 23° C. and RH of 0%, of not more than 10 cc(STP). mm/m².24 hr.atm,
   said multi-layer laminate having a moisture permeability of not more than 0.2 g.mm/m².24 hr.atm and an oxygen permeability of not more than 5 cc(STP).mm/m².24 hr.atm;

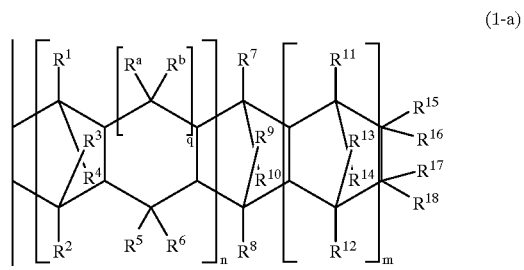

(1-a)

wherein n is 0 or 1; m is 0 or a positive integer; q is 0 or 1; $R^1$ to $R^{18}$, $R^a$ and $R^b$ are each independently an atom or a group selected from the group consisting of a hydrogen atom, a halogen atom and a hydrocarbon group; $R^{15}$ to $R^{18}$ may be bonded to each other to form a single ring or plural rings each of which may have a double bond; $R^{15}$ and $R^{16}$, or $R^{17}$ and $R^{18}$ may form an alkylidene group; and when q is 0, the bonding hands are bonded to each other to form a five-membered ring;

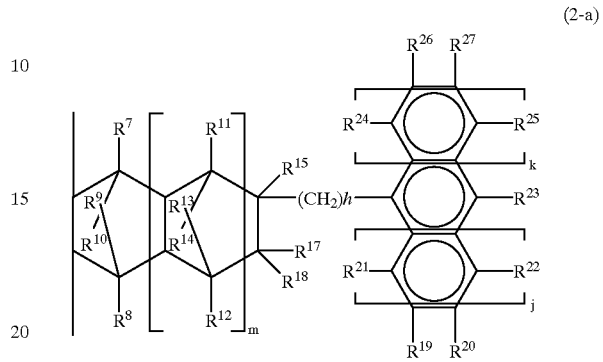

(2-a)

wherein m is 0 or a positive integer; h is 0 or a positive integer; j and k are each 0, 1 or 2; $R^7$ to $R^{15}$ and $R^{17}$ to $R^{18}$ are each independently an atom or a group selected from the group consisting of a hydrogen atom, a halogen atom and a hydrocarbon group; and $R^{19}$ to $R^{27}$ are each independently an atom or a group selected from the group consisting of a hydrogen atom, a halogen atom, a hydrocarbon group and an alkoxy group.

12. The multi-layer laminate as claimed in claim 11, wherein the oxygen permeability of the multi-layer laminate is not more than 1 cc(STP).mm/m².24 hr.atm.

13. The multi-layer laminate as claimed in claim 11, wherein the oxygen permeability of the multi-layer laminate is not more than 0.5 cc(STP).mm/m².24 hr.atm.

14. The polyolefin multi-layer laminate as claimed in claim 11, wherein the cycloolefin random copolymer (a-1) and its graft modified product (a-2) have an intrinsic viscosity (η), as measured at 135° C., of 0.1 to 10 dl/g and a softening temperature (TMA) of not lower than 50° C.

15. The multi-layer laminate as claimed in claim 11, wherein the cycloolefin resin is the ethylene/cycloolefin random copolymer (a-1).

16. A container or a packaging material comprising the multi-layer laminate as claimed in claim 11.

17. The container or the packaging material as claimed in claim 10, wherein the packaging material is a press-through pack or a blister pack.

18. The container or the packaging material as claimed in claim 10, wherein the packaging material is a packaging material for foods.

19. A sheet or a film comprising the multi-layer laminate as claimed in any one of claims 11 to 15.

* * * * *